June 1, 1965 B. J. MIDLOCK 3,187,329
APPARATUS FOR VEHICULAR SPEED MEASUREMENTS
Filed Sept. 30, 1960 4 Sheets-Sheet 1

INVENTOR.
BERNARD J. MIDLOCK
BY
*Edward H. Eames*
ATTORNEY

FIG. 3

INVENTOR.
BY BERNARD J. MIDLOCK
Edward H. Eames
ATTORNEY

*INVENTOR.*
BERNARD J. MIDLOCK

BY

Edward H. Eames
ATTORNEY

United States Patent Office 3,187,329
Patented June 1, 1965

3,187,329
APPARATUS FOR VEHICULAR SPEED
MEASUREMENTS
Bernard J. Midlock, Norwalk, Conn., assignor, by mesne assignments, to Laboratory for Electronics Inc., Boston, Mass., a corporation of Delaware
Filed Sept. 30, 1960, Ser. No. 59,757
12 Claims. (Cl. 343—8)

This invention relates to a device for measuring the speed of moving objects. More particularly it relates to apparatus for measuring the speed of vehicles on a roadway. The invention may, however, also be used for determining the speed of trains on a railroad track or of airplanes on or approaching a runway.

In general, this invention utilizes a narrow beam of radio waves generated by the circuit of the invention and transmitted by a directional antenna in a direction at a slight angle or parallel to the direction of a particular vehicle in question. These radio waves are reflected back to the sending unit by the vehicle and are received by the antenna. A Doppler effect results from the motion of the particular vehicle in question to vary the frequency of the reflected wave in proportion to the speed of the vehicle. By mixing a portion of the transmitted signal with the reflected signal, a beat frequency is obtained which is proportional to the speed of the vehicle. The frequency of this latter signal may be amplified and converted by a frequency measuring circuit into miles per hour or other convenient units.

The requirements of such speed measuring apparatus are dictated largely by the environment in which they are used; for example, when attached to a police vehicle, such apparatus should have an antenna which is concealed as much as possible; the transmitter and receiver should have a low current drain on the vehicle battery, and the complete equipment should be compact and readily accessible for use. In addition, since the detected signal is an audio signal, the amplifier must have a good audio response. Noise resulting from mechanical vibration of the antenna and amplifier elements and as introduced by spurious electrical signals such as ground reflection should be reduced. In addition, reflected signals having large variations in amplitude must be capable of being received and amplified to provide an output which is independent of such amplitude changes but which depends only upon the frequency of the received signal. In addition, the apparatus should be sufficiently selective between vehicles and should hold an output reading of the vehicle speed for a time interval sufficiently long for an individual to obtain a speed reading; on the other hand, the apparatus should respond sufficiently fast to obtain distinct readings between successive vehicles under most traffic conditions.

Accordingly, one aspect of this invention provides a novel antenna structure which is of a double modified pillbox type both connected to a single wave guide having the flared sides of a sectorial horn through two waveguides using a common wall member; all of these elements are adapted to be mounted in a member which appears similar to a spotlight when mounted on a vehicle. A klystron oscillator and crystal mixer assemblies are attached directly to the wave guides so that a complete transmitting and receiving apparatus is rigidly mounted in a compact unit of approximately five inches in diameter with the consequent decrease in mechanical noise and reduction in high frequency coupling leads between an oscillator and receiver and the antenna unit.

From another aspect, a transistor amplifier is provided which is ideally suited for amplifying the beat frequency detected signal and providing output speed indications. This amplifier provides a low current drain on the vehicle battery voltage, provides compactness, has no elements subject to mechanical vibration and is compensated against both temperature and supply voltage variations which may be present in the normal operation of such equipment. The above requirements are desirable in normal operation of a radar speed meter.

Another aspect of this invention reduces circuit components by providing a frequency measuring circuit which is directly connected to a meter or speed indicating circuit without the necessity of further amplification.

Another aspect of this invention provides a limiting of the amplitude of the received wave to a constant voltage by means of a zener diode. Such limiting or clipping assures that the size of the vehicle or its distance from the transmitter and receiver will not determine the speed reading.

A still further aspect of this invention is to provide an amplitude controlled gate circuit which controls the passage of the beat frequency Doppler signal to the frequency measuring and indicating circuits, in which the gate circuit in cooperation with the narrow beam selective antenna and a transistor amplifier having a gain which increases with frequency provide a selective discrimination between vehicles of various speeds and spacing which are approaching or leaving the speed meter apparatus.

It is another object to provide a low noise, high gain vehicle speed measuring apparatus.

Another object is to provide an improved transmitting and receiving apparatus which has low noise, high gain and small size.

It is another object to provide speed measuring apparatus having a transistor amplifier, for amplifying the Doppler beat signal, in which the amplifier is compensated for temperature and voltage variations which are present in the environmental operation of such speed measuring apparatus.

A further object is to provide improved gating, limiting and indicating circuits for such speed meter apparatus.

A still further object is to provide an improved transistor regulated power supply for cooperation with the speed meter transistor amplifier to assure that the A.C. speed passing through the amplifier are substantially independent of voltage variations.

My invention, the stated and further objects and advantages, will be more fully appreciated by referring to the illustrative embodiment described in the following detailed specification and drawings; the scope of the invention is stated in the claims.

Referring now to the drawings.

Figure 1:
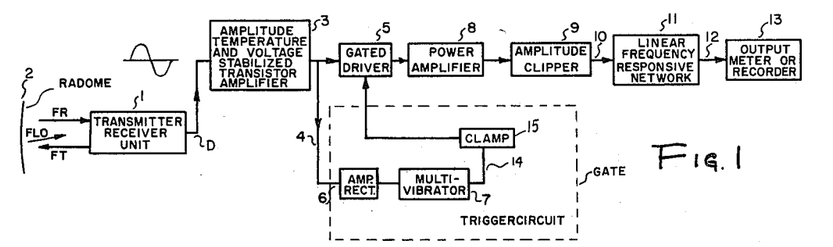
FIG. 1 is a block diagram of the preferred form of the invention.

In the drawings, FIG. 1 illustrates a block diagram of the invention exclusive of the power supply. A transmitter-receiving unit 1 is provided for mounting within a cylindrical member similar to a siren or a spotlight for attachment to an automobile; one end of the cylinder is closed by the casing and the other end is closed by a dielectric plastic polystyrene radome cover 2 which has a curved lens shaped surface to provide a rigid surface which will withstand the air pressure when mounted on a moving vehicle.

High frequency waves FT of approximately 10525 megacycles are radiated through the radome cover. A small quantity FLO of such transmitted waves are reflected from the cover back to the receiver of block 1 to serve as a local oscillator for mixing in a crystal mixer of the receiver.

Doppler modified reflected waves, FR, are reflected to the receiver from a vehicle and vary in frequency in dependence upon the speed of the vehicle.

The waves FR and FLO beat in a crystal mixer of the receiver to provide a Doppler difference alternating frequency output, D, depending upon the vehicular speed.

The Doppler wave D will hereinafter be referred to as an audio wave although it will be appreciated that it may be a sub-audio tone.

In the preferred embodiment, utilizing a transmitted frequency of 10525 megacycles, the beat frequency Doppler signal will be 31.3 cycles per second for every mile per hour of vehicle speed. For example, detection of a vehicle traveling at 1, 10 or 100 miles per hour will produce audio signals of 31.3, 313 and 3130 cycles per second respectively. The use of a different transmitted frequency will provide a different range of audio or sub-audio frequencies, and the detection of vehicles such as trains or airplanes as opposed to automobiles may make it desirable to utilize a different transmission frequency or a different audio band. However such details are well known and are not a part of this invention.

The audio wave of FIG. 1 is amplified in a group of transistor amplifiers 3 which are stabilized against amplitude, temperature and voltage variations which are inherent in the environmental operation of the apparatus.

The stabilized audio signal on line 4 is fed into a normally blocked gated driver transistor 5 which prohibits passage of any audio speed signal except when gated by audio signals of a desired magnitude. Such gating assures that undesired weak signals will not pass to the output.

For example, Doppler signals from vehicles which are not within the desired range of the apparatus will be of insufficient amplitude to gate the driver. Only Doppler signals of sufficient amplitude to give reliable speed readings are permitted to pass through the driver. Weak signals from a swaying tree, for example, are also controlled.

The stabilized audio signal on line 4 feed a gate, shown in dotted lines, which is controllably biased so that only audio signals of a predetermined magnitude will open the gate. The magnitude of the audio signal is determined by a gain control in amplifier 3. The gate includes a transistor amplifier and rectifier 6 connected to line 4 for controlling a transistor multivibrator 7 to control a clamp 15. The clamp 15 is normally operated to prevent speed signals from passing through the gated driver 5. Operation of the gate circuit removes this clamping to permit signals to pass through driver 5. This gating operation exists for the duration of the input signal.

Receipt of a sufficient desired amplitude of audio signal, as determined by the gain control operates a transistor amplifier-rectifier 6 and trigger multivibrator 7 which operates clamp 15 opens the gated driver 5 by reducing the bias on line 14 to allow the audio signal to be amplified at 8 and supplied to an amplitude clipper 9.

The amplitude clipper 9 is a zener diode which clips one half of the audio wave in one conductive direction and clips the other half of the wave at a predetermined voltage determined by the characteristics of the zener diode.

The output of the clipper on line 10 is then a series of substantially square wave pulses of constant amplitude having a frequency depending upon the speed of the detected vehicle.

This series of pulses then passes through a frequency responsive network 11 which provides a current output at 12 in proportion to the frequency of the input signals. This current output then controls a meter and/or recorder 13 to provide a visual and/or graphic indication of speed.

Figure 2:
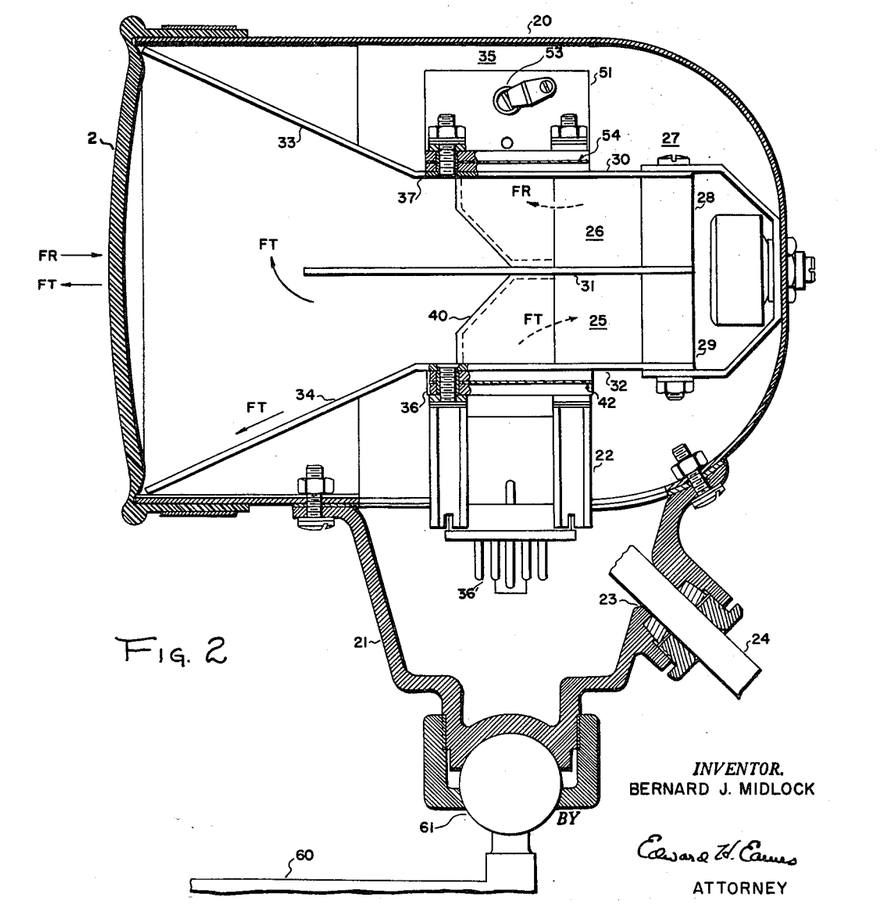
FIG. 2 is a side view cross section of the transmitting and receiving waveguide assembly mounted within a substantially cyclindrical casing.
Figure 3:
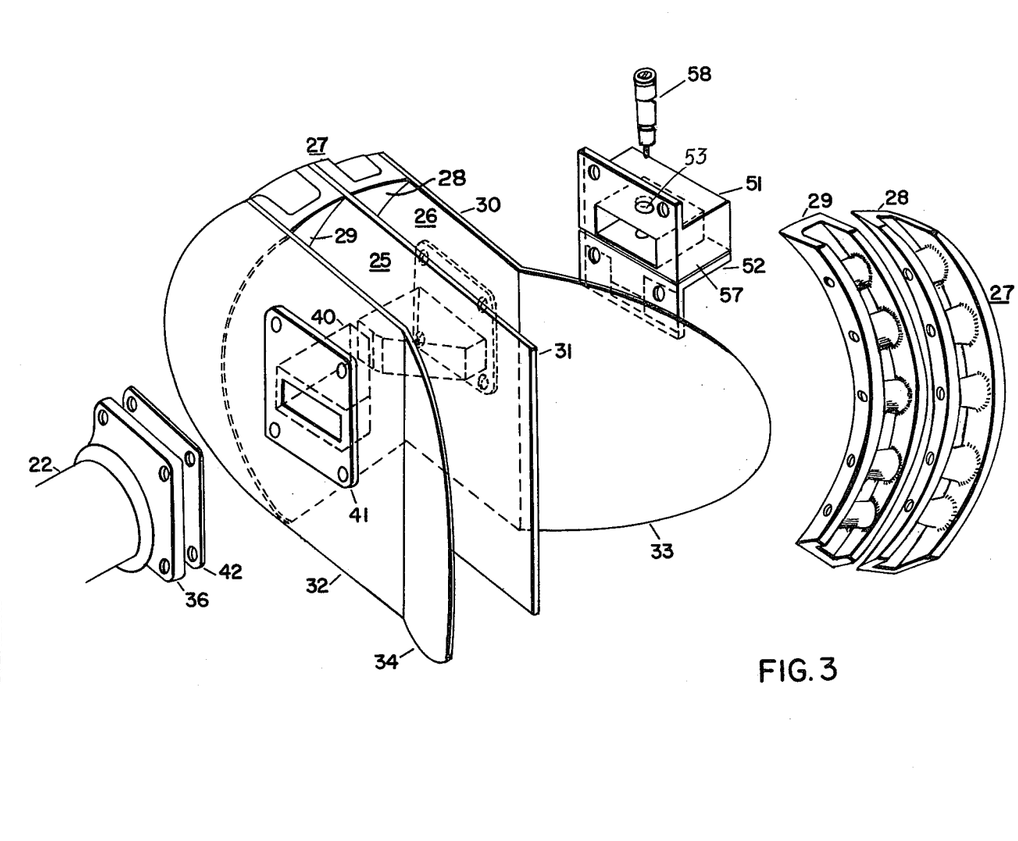
FIG. 3 is a perspective view of the transmitting and receiving waveguide assembly outside of the casing.

FIG. 2 illustrates a cross section of the transmitter-receiver unit 1 in a vertical side view in which the dimensions are substantially identical to the preferred embodiment. FIG. 3 has the casing removed.

A cylindrical casing 20 is provided to simulate a searchlight or vehicle headlamp. A handle 21 is connected to the casing for handling the apparatus while also serving as a support member and as an enclosure for the klystron oscillator 22.

An opening 23 is provided in the handle for providing leads 24 for input connections to the klystron and output connections from the crystal mixer.

Within the casing are individual transmitting and receiving antennas 25 and 26 which essentially include two modified pill box antennas connecting wave guide members and a common sectoral horn.

Pill box antennas are parabolic antennas which are symmetrically cut on both sides of their center point and then enclosed within two parallel plates to provide a high gain antenna having a highly directive beam.

Such a cut parabolic or cylindrical reflector is shown as plate 27; the top portion 28 serving as a reflector for received signals while the bottom portion 29 serves as a reflector for transmitted signals.

Three parallel plates 30, 31 and 32 serve to enclose the parabolic reflectors 28 and 29 into transmitting and receiving modified pill box antennas for directing energy to or from the reflectors.

Plates 30 and 32 are flared vertically up and down respectively at 33 and 34 while the center plate 31 is terminated between these two flared members.

With the casing 20 mounted about these rectangular waveguide members, as shown, the casing forms the vertical third and fourth enclosing sides of each waveguide and flared members 33, 34 while also permitting convenient removal of the antenna unit from the casing.

A klystron oscillator 22 and crystal rectifier assemblies 35 are mounted directly upon plates 32 and 30 respectively in contrast with the conventional practice of having both of these elements at a remote location. This connection eliminates the need for coupling high frequency energy over long leads both to and from the antenna.

In addition, another advantage of mounting the klystron directly on plate 32 is that a relatively simple connection may be made to feed the antenna as will appear below.

The klystron 22 is a type VA-204 reflex manufactured by "Varian Associates" and is controllable in frequency by variation of the repeller voltage. The lower part of this tube has terminal pins 36 for connection to heater and other voltage sources. The high frequency output voltage radiates directly from the top of this tube without connecting leads.

Consequently by cutting a suitable opening in waveguide plate 32, when the klystron is mounted by its flange 36 by screws in the manner shown, the high frequency output of the klystron is immediately available within the transmitting waveguide through this opening.

A ninety degree H-bend rectangular waveguide corner feed 40 is provided having dimensions which are computable from standard texts. The corner has a flange 41. An insulator is provided at 42 and the complete assembly of klystron, insulator and corner feed are directly connected to plate 32.

The mode of operation of the transmitter apparatus is arranged so that the electric vector of the wave from the klystron is in a horizontal direction across the shortest dimension of the corner 40. This is in effect parallel to the bend line 37 of plates 30 and 32. High frequency waves radiated from the klystron pass through the waveguide feed 40 in opening 32 and radiate therefrom at the focal point of reflector 29.

These transmitted waves, still horizontally polarized, are reflected from the reflector back down the waveguide along wall 32 and common wall 31.

At the termination of common member 31, the waves FT follow both flared walls 33 and 34 which effectively form a sectorial horn when placed in the casing. Wall 33, while it physically appears primarily in the receiver portion of the waveguide apparatus, is also a portion of the transmitting channel and its omission will seriously affect the antenna pattern radiated.

Consequently, the length of plate 31 is critical with respect to flared members 33 and 34 so that the waves will be transmitted along both walls 33 and 34.

The reverse operation occurs upon receipt of a reflected signal.

The overall result of the above is that the two flared members 33 and 34 serve as a common sectorial horn for both transmission and reception of high frequency radio waves. This arrangement has thereby reduced the number of parts normally used, while also providing compactness and mechanical rigidity with the consequent reduction of noise in normal operation.

A factor which has determined the critical length of plate 31 is the desire to make the major axes of both the transmitted and received beam pattern substantially coincident with each other.

The effect of the flared members 33 and 34 is to change the characteristic impedance of the waveguide to more closely match that of air so that fewer reflections occur as the transmitted and received waves enter and leave the waveguide and also reduce vertical beam width.

The crystal mixer assembly is shown at 35. This includes two waveguide members 51 in solid lines and 52 in dotted lines which are insulated from each other along their vertical adjacent side at 57 and from the plate 30 at 54.

A hole 53 is drilled in 51 for insertion of the crystal mixer 58 through the hole and waveguide so that one end of the crystal makes electrical contact at 52 and one end makes contact at 51. Two terminal leads which are connected to the members 51 and 52 conduct the detected signal from the crystal through leads 24 to the amplifier.

It should be noted in FIG. 3 that both flared members 33 and 34 taper inwardly toward the center of the waveguide.

Since a waveguide radiator is utilized, the energy reflected from the parabolic reflector is concentrated largely in the center of the reflector with very little energy at both ends. This arrangement therefore has advantages over a dipole radiator. Therefore, as to the majority of the energy in the center of the waveguide, the narrow terminating ends of the tapered members 33 and 34 form a sectorial horn of two sides. The absence of the normal third and fourth sides is immaterial since little energy is present at those sides. However, the casing in effect serves as the vertical sides of the horn for any energy which may be present at such sides.

FIG. 3 is a perspective view of the waveguide assembly removed from the casing. The same numbers are used as in FIG. 2 and the above description is descriptive of both FIG. 2 and FIG. 3.

However, it will be appreciated that for a square casing, the inward taper of 33 and 34 may be omitted. Also, third and fourth sides may be utilized if desired; for example, when using a dipole radiator.

The overall result of the antenna assembly of FIGS. 2 and 3 described above is to concentrate the energy in the center of the reflector leaving only a small amount to be lost at the edges of the system. In addition size has been reduced particularly by the common horn; noise has been reduced by the mechanical rigidity and the direct connection of the crystal and oscillator to the antenna assembly.

In addition a narrow beam has been produced having a horizontal total beam angle of 18° and a vertical total beam angle of for example 28° between half power points.

Furthermore, the device is adaptable for connection to a vehicle by arm 60 and swivel connection 61 while also being adaptable for hand control by separation of the swivel connection.

Figure 4:
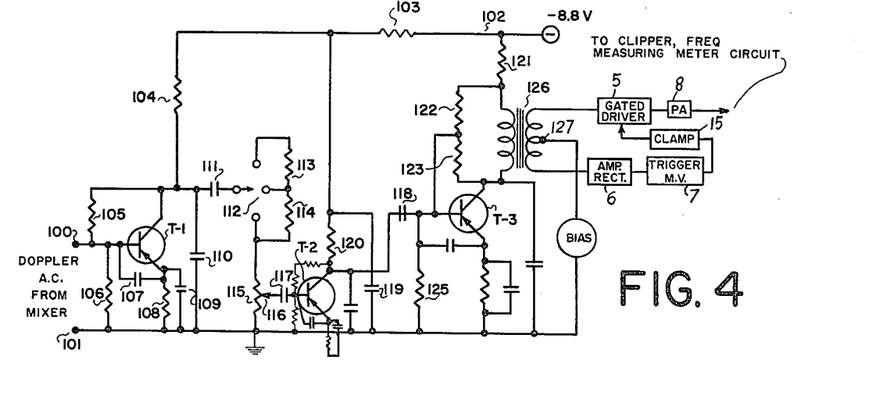
FIG. 4 is a schematic illustration of three stages of amplification of the Doppler signal with a block diagram of the driver, gate and several other stages.
Figure 5:
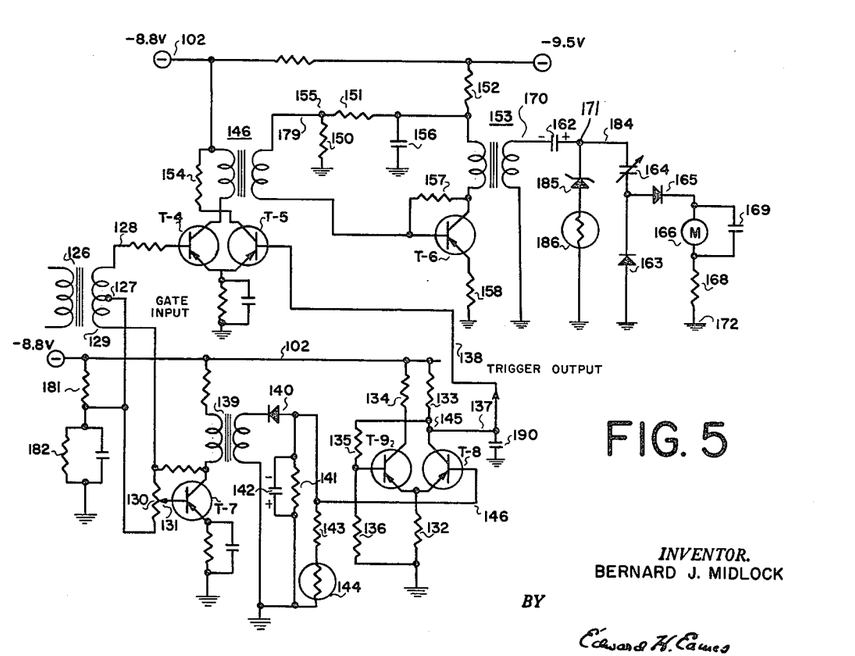
FIG. 5 is a continuation of the circuit of FIG. 4 with the block diagrams of FIG. 4 being schematically shown.

The transistor amplifier (FIGS. 4 and 5)

The transistor amplifier is adapted for receiving Doppler speed signals of an audio frequency up to 3130 cycles per second. The output of the amplifier controls a meter and graphic recorder to indicate the speed of the vehicle.

Since the Doppler input signal frequency is proportional to the speed of the vehicle, the amplifier is designed to receive and amplify audio frequencies approximately over the range of 10–3130 cycles per second, for example.

A frequency sensitive circuit is then utilized to provide an output to a meter and recorder in proportion to the frequency so that the meter and recorder indicates the speed of the vehicle.

Selection between vehicles as a function of their time or distance spacing along the roadway and between their speed is highly desirable. Consequently the amplifier has an amplification characteristic which increases with frequency so that as between a slow and a high speed vehicle, the high speed vehicle signal is amplified more than the low speed vehicle.

A gated driver transistor circuit is provided to convey the speed signal from the amplifier to a clipper and then to the frequency measuring circuit and the recording meter. The driver is normal closed or blocked to prevent the audio speed signals from reaching the meter. However, when the signals reach a predetermined amplitude, the gate is opened to allow the speed signals to pass through the driver to the meter circuit. The result of this gating is that between high and low speed vehicles at substantially the same distance from the transmitter, the high speed vehicle signal opens the gate and driver to pass these high speed signals to the meter.

Another advantage of the non-linear amplifier characteristic is that it provides a reasonably equal time for reading the speed of high and low speed vehicles. For example, a high speed vehicle would normally provide a reflected signal for a shorter reading time. However, by providing higher gain for high speed vehicles, such vehicles may be read at a farther distance from the transmitter than a slow speed vehicle so that the overall reading time for both high and low speed vehicles is substantially improved.

As between vehicles having substantially the same speed, the vehicle which is closer to the transmitting antenna will provide a larger amplitude signal and consequently opens the gate and driver to be recorded on the meter provided the vehicle is close enough in range to provide a sufficient signal to operate the gate. The above operation applies whether vehicles are approaching or leaving the transmitting area.

The operation of the amplifier and associated circuitry of FIGS. 4 and 5 will now be described. A Doppler A.C. signal is received at terminals 100 and a common terminal 101 from the crystal mixer 35 of FIG. 2. The frequency of the audio wave depends upon the speed of the detected vehicle.

Terminal 101 is connected to the base of PNP transistor T-1. T-1 may be a 2N654 and is biased class A to be normaly conducting. Class A bias results from the bleeder supply between a minus 8.8 volt source at 102 through resistors 103, 104, 105 and 106 to the common terminal 101. This negative bias at the base of T-1 and the emitter resistor 108 cause T-1 to normally conduct as a class A amplifier.

The bleeder supply of 102–106 serves a four fold function to provide transistor stability. Firstly, it provides a forward bias at the base of T-1 as stated above. Since resistor 104 of the bleeder supply is also the collector impedance, the bleeder supply provides a second function of D.C. stabilization.

For example, assume that the supply potential at 102 should increase: this would increase both the collector and base voltage of T–1 thereby tending to increase conduction of T–1. However, any increase in conduction of T–1 will cause a greater voltage drop across 104 so that the base voltage of T–1 remains substantially constant even though the source voltage may change. Consequently the current conduction of T–1 remains substantially unchanged and T–1 is stabilized against variation in supply voltage.

In addition the bleeder supply provides a third function of compensation against temperature variation. Should the ambient temperature increase, T–1 tends to conduct more current because of the greater activity of the semiconductor molecules. However, any such increase in current flow through 104, as described above, lowers the base voltage which is across resistor 106 so that the transistor tends to conduct less. The overall result is that the transistor current flow remains substantially stabilized against such temperature variations. Transistor collector to base leakage current effects is also reduced by this circuitry.

The fourth function of the bleeder supply is that it provides a path for negative A.C. feedback from the collector to the base thereby making the A.C. amplifier slightly degenerative at all frequencies. Since transistor gain characteristics vary individually even though obtained from the same manufacturer, and the gain also increases with temperature, such degeneration stabilizes the A.C. amplification and permits the replacement of transistors with a minimum effect on the associated circuitry.

Capacitor 107 is connected between the emitter and the base and resistor 108 and capacitor 109 are connected from the emitter to the common terminal.

Capacitor 107 has a low value, for example .001 microfarads, so that it by-passes any R.F. waves which may be present at the amplifier to the common terminal 101 and permits amplification only of audio frequencies. Police and other interfering R.F. transmissions are thereby eliminated.

Capacitor 109 is a large capacitor, for example 100 microfarads, and acts as an audio by-pass. Resistor 108 is a small emitter impedance which provides a small D.C. class A bias and also further acts as a compensator for any temperature variation; any increase in current flow due to temperature variation will increase the voltage drop across this resistor and thereby provide additional bias between the emitter and base of T–1 to decrease this current flow.

The reason for the voltage and temperature compensation mentioned above will be obvious when it is considered that the apparatus may be supplied with power from a vehicle battery having regulation sufficiently good for operation of an automobile but insufficient for precision electronic apparatus. Also the apparatus is subject to temperature changes of a seasonal nature as well as to that of its operating environment when designed to be portable.

In the vacuum tube art, these problems were of a much less serious nature and the heat of the filament would heat the tube in cold as well as warm weather.

In the transistor art, there is no filament element and any heat which is generated is usually dissipated in a heat sink to protect the transistor; also, the molecular activity and leakage characteristic greatly increases with temperature variation and have thus required novel methods for satisfactory operation of the amplifier.

Capacitor 110 limits the audio band of the amplifier pass so that frequencies above the desired range of approximately 3130 cycles per second are shunted to the common point.

The amplified output at the collector of T–1 is connected through a coupling capacitor 111 to a range switch 112. Range switch 112 has three positions for short, medium and long range detection of moving vehicles, and in effect introduces more or less resistance at 113 and 114 into the gain control circuit at potentiometer 116. The arm 116 of potentiometer 115 and capacitor 117 couple the audio signal into the base of T–2.

The circuit of T–2 is substantially the same as that of T–1. T–2 does not have a range switch but couples its output through capacitor 118 directly to the base of T–3.

Condenser 119 is connected between the common reference point 101 and the junction of 103 and collector impedance 120 so that the collector is decoupled from any A.C. variation in the power. Such variation in the power supply may occur because of the connection of several stages to the same power supply; feed back between such stages may well cause oscillation unless such decoupling is provided.

Since transistors are inherently low voltage current amplifiers T–3 differs from T–1 and T–2 in that the collector load has a step-up transformer 126 to provide an output of approximately 100 volts peak to peak.

The advantage of transformer coupling provides a convenient method of impedance matching between stages while also providing a current or voltage gain as desired. The increase in the gain using transformers permits the use of fewer transistor amplifiers at a considerable saving in cost and in the number of components for the required amount of gain.

The circuit of T–3 includes a bleeder supply resistors 121, 122 and 125 and is otherwise substantially the same circuit as T–1 and T–2 except for the transformer circuitry.

The primary of 126 is connected to the collector of T–3 and the secondaries are connected to control the gated-driver amplifier, power amplifier, and the gate circuit so that an output meter or record may read the speed of the vehicle as will appear subsequently.

Transformer 126 besides amplifying the voltage output of T–3 also provides an output which because of its inductive characteristic increases with frequency. While it would be desirable to have an ideal transformer which increased its output in proportion to the frequency, transformer 126 because of the loading of T–3 produces a slight drop-off in response at the higher frequencies. Consequently, A.C. feedback is provided through 123 to the base of T–3 so that such degeneration will reduce the mid-band peak response. This fact is also an additional reason for the degeneration in transistors T–1, T–2, T–6 and T–7, for example.

Resistors 122 and 123 and the primary of 126 form a part of the voltage divider to determine the amount of D.C. voltage and temperature stabilization and also determines the amount of A.C. feedback from the collector to the base to reduce this undesirable peak.

The secondary of 126 in FIG. 4 is connected to the gated driver, gate, trigger circuit, power amplifier, clipper, frequency measuring and meter circuit elements shown in block form in FIG. 4 and which will appear schematically in FIG. 5.

In FIG. 5 the secondary of 126 has a center tap 127 and two output terminals 128 and 129. The center tap is connected to a bias source of a minus 1.47 volts, for example, with reference to the common terminal shown as ground. This bias is developed by a bleeder from 102 to ground through resistor 181 and 182. Terminal 128 is connected to the base of driver transistor T–4 through a small swamping resistor; T–4 is forward biased by the negative bias at center tap 127.

Clamp T–5 has its collector impedance 154 connected to source 102. T–5 is normally conducting as will appear hereinafter. Consequently, emitter of T–5 is substantially above ground and emitter biases T–4 to nonconduction. Consequently T–4 is clamped and prevented from conducting in the absence of an A.C. signal in line 128 of 126.

While the above is the preferred method, the collectors of T-4 and T-5 may be connected together to the primary of transformer 146, omitting resistor 154.

The gate circuit includes a gate amplifier T-7, rectifier 140 multivibrator T-8, and T-9 and clamp T-5.

If an A.C. signal is present at 126, a portion of that signal is conducted to the base of gating transistor T-7. This circuit is from the secondary of 126 at 127, through gate adjusting potentiometer 130, and back to line 129 of transformer 126. A potentiometer tap at 131 couples a portion of this A.C. signal and the bias to the base of T-7.

The gate adjusting potentiometer 130 provides control over the amount of signal input to T-7. By decreasing the amount of A.C. signal input to T-7, the apparatus may be made to respond to vehicles only above a particular speed or only to vehicles within a particular range; higher speed vehicles will produce a larger signal at transformer 126 and vehicles which are closer to the antenna, will provide a larger amplitude signal whether approaching or receding from the transmitter.

A monostable trigger circuit is provided including transistor T-8 and T-9 with a common emitter impedance 132 and individual collector impedances 133 and 134.

A bleeder supply includes the series connection resistors 133, 135 and 136. The bleeder also supplies the coupling between the output of T-8 to the input of T-9.

In normal operation, T-9 is conducting because of the negative voltage developed across 136 of the bleeder supply. The voltage developed across emitter impedance 132, by the conduction of T-9, prevents T-8 from conducting as is conventional for monostable multivibrators.

If a vehicle signal having sufficient amplitude has been detected, an A.C. signal will be present on the base of gate T-7 and will be coupled through transformer 139 and rectified at 140 to develop a negative D.C. voltage across the parallel combination of resistor 141 capacitor 142 and series resistor 143 and thermistor 144; this negative voltage appears on line 146 and triggers T-8 into conduction.

As T-8 conducts, the voltage at its collector point 145 drops to that of the common emitter 132. Consequently, the voltage at the base of T-9, which is a fractional part of this voltage because of the bleeder, is less than that of its emitter and T-9 ceases conduction.

Junction 145 is connected through leads 137, and 138 to the base of T-5 and through a large capacitor 190 to ground. Since T-8 is normally non-conducting, a large (−8.8 volts) negative voltage is present at the collector of T-8 and therefore through line 138 to the base of clamp T-5 so that T-5 is normally conducting as was assumed above.

The reversal of conduction of T-8 and T-9 due to the presence of a vehicle, drops the voltage at 145 so that T-5 ceases conduction and ceases to clamp T-4, the A.C. vehicle signal on line 128 may now pass through step-down transformer 146 to power amplifier T-6.

Capacitor 190 is normally charged negative from the source on line 102 and is connected from the collector of T-8 to ground. This capacitor serves two functions. Firstly it acts as a filter for any A.C. which may be present and which could conceivably provide erratic action in gating T-5. In addition, capacitor 190 provides a delay in the turning-off of the gate driver T-4. For example in normal operation T-8 is cut off and capacitor 190 is charged to provide a negative voltage on line 138 and the base of T-5 so that T-5 is normally conducting and T-4 is blocked. When a signal of sufficient amplitude is received, T-8 conducts so that capacitor 190 is discharged rapidly through T-8; after this short delay T-4 is permitted to conduct to permit the A.C. signals to enter the meter circuit.

However, when the received A.C. signal has decreased to a point where it is of insufficient amplitude to control the gate, T-8 would cease to conduct. However, such received signals may continue for a short time to pass through T-4 to the meter circuit since capacitor 190 is charging through resistor 133 to the source voltage; until 190 reaches a sufficient negative charge, the received signal may still pass to the meter. This is a delayed meter fall-out effect.

Thus any signal from a vehicle which is present, is read on the meter during the time of its presence and for a short time thereafter.

As a result, should the vehicle signal decrease in amplitude for a short instant of time such as that caused by cancellation with a signal reflected from ground or by variation in the amplitude of the signal as the vehicle passes over a railroad track or a bump or hidden behind some object, the decrease of the reflected signal will drop out of the gating circuit of T-7, T-8 and T-9, the decreased vehicle signal however if present will still pass through T-4 to the meter circuit. Should the vehicle signal then return to the proper amplitude, the gate will operate and after the quick discharge of 190, these received signals will continue to pass through T-4 to the meter.

The time constants of capacitor 190 are chosen so that its discharge rate is slightly faster than the response time of the speed indicator meter rise characteristics and the charge circuit time constant of 190 is substantially the same as the rate at which the meter will fall. Consequently, short or intermittent variations in amplitude of the vehicle signal provide only minor variations in the meter circuit.

The overall gate circuit therefore not only permits the passage of signals only of a controllable magnitude but also prevents the loss or decrease of a reading because of an intermittent signal. The advantage of this latter circuit is apparent when it is considered that if the input speed signal should decrease in amplitude for a short instant, the meter would be required to fall out and then rise again before an accurate reading is obtainable.

The power amplifier T-6 is connected at its collector through the primary of a step down transformer 153 and resistor 152 to a negative source of −9.5 volts. Resistors 150, 151 and 152 form a bleeder supply having a connection at 155 through lead 179 and the secondary of 146 to bias T-6 for forward conduction.

Capacitor 156 has a large value of 500 microfarads and serves to decouple T-6 from the power supply in the same manner as 119 of T-2. The capacity of 156 is four times as large as 119, however, since the resistance impedance 152 in the collector of T-6 is very low, 10 ohms, and the capacitive reactance of 156 must be made correspondingly low to shunt any A.C. in the power supply to the common terminal.

Resistor 157 provides for static D.C. stabilization and A.C. negative feedback as in T-1, T-2 and T-3. Reference to static D.C. stabilization includes stabilization of the transistor against both steady state and transient changes in supply voltages and ambient temperature or difference in characteristic between individual transistors of the same type and of the same or different manufacturers.

The emitter of T-6, in contrast with the other stages, is connected through a small unby-passed resistor 158 of one (1) ohm for temperature stability with the result that most of the output of T-6 is developed across the primary and secondary of transformer 153.

The secondary of transformer 153 feeds a limiter or clipper circuit comprising a series Zener diode 185 and a thermistor 186 through capacitor 162. When the voltage at point 170 goes negative, the Zener diode conducts in its forward direction to charge capacitor 162 and develop only a small voltage from point 171 to the common ground reference point 172. This ground is the same as line 101 in FIG. 4.

On the first part of the positive half of the A.C. wave at 170, the Zener diode is reverse biased to nonconduction. When the voltage at 171 reaches a positive 43 volts, the Zener diode breaks down in the reverse direction. This breakdown occurs fairly quickly since the voltage on capacitor 162 and the A.C. voltage at point 170 are aiding each other.

Hence, a sharp voltage breakdown characteristic of diode 185 is obtained and the output at line 184 is limited to 43 volts, the Zener diode acts as a constant voltage source in that it maintains the same voltage drop even though the input voltage may go above the breakdown voltage.

The thermistor 186 compensates for any temperature variations. Such compensation by the thermistor is desirable since the Zener diode has a positive temperature coefficient. Hence, by utilizing a thermistor having a negative temperature coefficient, the effects of temperature may be substantially eliminated, this assures that the clipped output of the limiter or clipper 185 may remain substantially at 43 volts independent of temperature variations.

Consequently, the output at 184 is in series of square wave pulses having a peak value of a positive 43 volts. Signals less than 43 volts will not be clipped and may pass to the output. Should there be any negative pulse at 184, this pulse is clipped by diode 163. Diode 163 will also discharge capacitor 164.

The positive pulses on line 184 all have a magnitude of positive 43 volts and a frequency which will vary with the speed of the vehicle detected.

A frequency measuring and meter or indicator circuit is connected to line 184 and includes a diode 165, meter 166, resistor 168, and a tunable capacitor 164. Also, a jack may be provided so that a graphic recorder may be inserted in the circuit either separately or in combination with meter 166.

Resistor 168 is normally a low impedance of 604 ohms, for example, when compared with the capacitive reactance of capacitor 164 in the audio frequency range utilized. As a result 168, 166, 165 and 168 comprise a differentiating circuit; each positive pulse on line 184 produces a sharp peak of current flow and the meter 166 reads the average of such current flow.

For example, for a high speed vehicle of 100 m.p.h. the audio frequency received will be 3130 cycles per second and capacitor 164 will have a reactance of approximately 2K ohms. At 10 miles per hour, the reactance of 164 will be approximately twenty thousand ohms.

As a result, the meter circuit is frequency sensitive and will provide current readings proportional to the speed of the vehicle.

Since linearity of the meter reading at 166 versus speed is desirable, though not essential, the capacity of 164 and the value of resistor 168 may be adjusted.

A large capacitor 169 is placed in parallel with the meter to prevent its fluctuation between pulses.

It should be noted that the frequency measuring and meter circuit is designed to operate at low current levels without the necessity of further amplification between the frequency measuring circuit and the meter. This operation is in contrast with prior methods and provides equivalent results with fewer elements.

*The regulated power supply*

Figure 6:
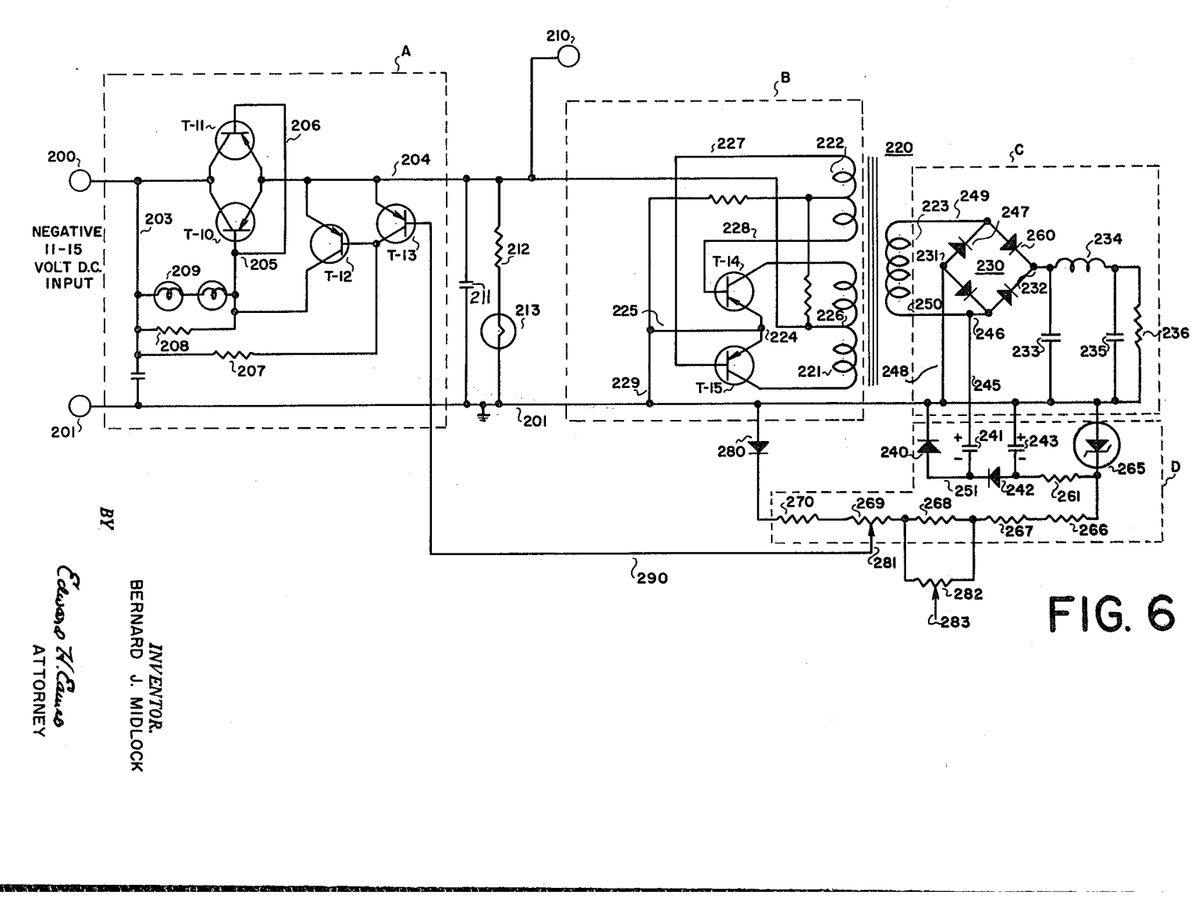
FIG. 6 is a schematic illustration of the regulated power supply.

In FIG. 6 there is shown four blocks legended A, B, C and D of a regulated power supply which has the characteristics of being self protected against a short circuit on either its 9.5, 250 or 100 volt power supplies.

Block A is a transistor controlled negative 9.5 volt voltage regulator whose output is used to supply the transistor collector circuits. This output voltage controls a 2500 cycle transistor converter, legended as block B, which converts the regulated D.C. to 2500 cycle per second A.C.

The 2500 cycle A.C. is then rectified to provide a positive voltage 250 volt source in block C and a negative voltage source 100 volt at block D. Both the positive and negative voltages have the same common input transformer so that failure of the transformer or its associated circuitry affects both the positive and negative supply voltages.

The negative voltage source of block D is further regulated by a zener diode, and a fraction of the zener voltage is utilized as a constant voltage source against which the unregulated input voltage of block A is balanced.

The overall result of this arrangement of the various circuit elements in the four blocks is that the power supply is self-protective. For example, should the positive voltage source of block C short circuit or should the klystron short circuit, there will be no positive or negative voltage from the block C or D so that there is no constant voltage source on line 290 for balancing in regulator A. As a result there will be no voltage output from block A and consequently there is no voltage supply to the transistors such as in the converter circuit of block B with the result that the positive and negative power supply and the voltage regulator will be shut down and the transistors T14, T15, diodes 247, 260, 232, 230 and 242 will be protected from burn-out.

*The voltage regulator*

The input to block A is illustrated as terminals 200 and 201 for connection to a poorly or unregulated input voltage which may vary between a negative 11–15 volts with respect to the common line 201 while still maintaining a negative 9.5 volt output.

Since it is desired to provide a regulated D.C. output of a negative 9.5 volts at the regulator output on line 204, a variable impedance element in the form of two parallel connected transistors T–10 and T–11 each have their collectors connected to the regulator input line 202 and their emitters connected to the regulator output on line 204. The bases of T–10 and T–11 are commonly connected at 206 to a junction 205; the voltage at this junction will control the impedance of T–10 and T–11.

Therefore, the regulator output voltage on line 204 will be controlled not only by the input voltage on line 200 but also by the transistor base control at junction 205. The control of this base circuit at junction 205 occurs through operation of T–13 and T–12 which are in shunt with each other and with T–10 and 11 and in series with the load current. The load current therefore has four shunt paths, the control of which will result in voltage regulation as will now be described.

For an understanding of the operation of FIG. 6, assume that a steady state of voltage regulation has occurred in which the input voltage at 200 is at the minimum of 11 volts, for example; assume also that the load current flow through T–10 and T–11 has a produced voltage drop of 1.5 volts so that the voltage regulator output voltage on line 204 is the desired negative 9.5 volts.

Under such an assumed steady state condition, a small current flows through the load impedance 212 and the emitter and collector circuit of T–13 through resistor 207 and line 203 to the negative input terminal 200. T–13 is a high gain amplifier which will amplify any voltage difference between a reference voltage at 290 and the regulator output line voltage at 204. Amplifier T–13 has conducted current because the voltage drop across T–10 and T–11 also appears across the emitter and collector of T–13.

Transistor T–12 has its emitter connected to line 204, and its base controlled by the collector of T–13; its collector is connected to control junction 205 and through the parallel connection of two tungsten filament lamps 209 and a swamping resistor 208 to unregulated input line 200. Transistor T–12 has a lower gain than T–13 and is substantially a power transistor.

In the assumed steady state condition, T–12 is normally in a non-conducting or low conducting state; its emitter is at the regulated output voltage of −9.5 volts and its base is substantially at a more positive potential because of the voltage drop across 207 by the conduction of T–13.

In the assumed steady state condition, this conduction of T–12 is low or non-conducting and the voltage drop across lamps 209 is also low; the potential at junction 205 is substantially at the unregulated input potential of line 200 with the consequent low impedance voltage drop across T–10 and T–11 of 1.5 volts in the assumed example.

In the assumed steady state condition, it is desirable that T–13 and T–12 be in a conducting state so that any variation in voltage will result in a smooth voltage regulation by variation in conduction of T–13 and T–12. However, in that assumed state, it is also desirable to have junction 205 substantially at the potential of line 200 for maximum conduction so that the minimum of 1.5 volts will be dropped across transistors T–10 and 11. In order to meet both of these conditions a small impedance is desired in the collector of T–12 between junction 205 and line 200. Tungsten filament lamps 209 serve this purpose.

Such lamps also have a nonlinear impedance which increases with current flow which has further advantages as will appear hereinafter.

Assume now that the input voltage rises to a negative fifteen volts for example. Line 204 will therefore be more negative. The conduction of T–13 therefore decreases which makes the base of T–12 more negative so that T–12 conducts more current. This causes a greater voltage drop across the parallel combination of 209 and 208 so that the base of T–10 and T–11 goes positive. The impedance of T–10 and T–11 is thereby increased resulting in a lower negative voltage on line 204 until line 204 reaches the desired 9.5 volts regulated output.

In the above example, the increase in current flow of T–12 would result in a greater wattage loss in T–12 with a consequent reduction in efficiency of the regulator plus a greater possibility of burn-out of T–12. To overcome this effect, the non-linear characteristic of lamps 209 is utilized. An increase in current flow through the lamps results in an increase in impedance as a function of temperature of the lamp filament.

Therefore, in the above example, as the current flow from T–12 increases, the voltage drop across the lamps would increase by a greater percentage than the increase in current flow with the result that for the same amount of control voltage desired across 208 and 209, and at junction 205, a small current flow is required through T–12.

However, a control voltage at 205 which is too large may be developed in some cases if the temperature of the lamp filament of the system should rise too greatly. In such a case, the voltage across the lamps will be sufficient to cut-off T–10 and T–11 thus cutting off the voltage regulator. To prevent this from occurring, resistor 208 is placed in parallel with the lamps 209.

It should be noted that the regulated source of block A supplies the filament of the klystron at 213 through a load voltage dropping resistor 212. A filter condenser is provided at 211 and a terminal is provided at 210 for connection of the regulated 9.5 volt negative output to the collectors of the transistor circuitry described before.

One feature of the regulated power supply is that T–10, T–11, T–12 and T–13 are all in shunt with each other and in series between the input and the load. As between each other, T–13 controls T–12 which controls T–10 and T–11. As a group, however, each controls the flow of current which flow in T–13 or T–12 to control T–10 and T–11 also flows to the load. Thus no loss in power occurs in the regulated supply, except of course, the power which is dissipated as heat in the transistors. Consequently a higher efficient power supply has been provided.

From another point of view the regulator of block A includes three parallel transistor circuits connecting the input voltage to the load. A first of the transistor circuits T–13 compares the regulated output voltage on line 204 with a reference voltage on line 290 to vary its conduction in accordance with the unbalance. By connecting the second stage T–12 to be controlled by T–13, the conduction of T–13 varies inversely with the conduction of T–12. Similarly by controlling a third circuit, T–10 and T–11, by the second circuit T–12, the third circuit controls load current inversely with that of T–12 and directly with that of T–13.

Thus a parallel combination of control circuits having alternate increasing and decreasing current density of different amounts provide a substantially constant current score of regulated voltage.

The converter circuit

The converter circuit is shown in block B for converting the negative 9.5 volts D.C. on line 204 to 2500 cycle A.C.

Two transistors T–14 and T–15 are shown connected to primary of transformer 220, the D.C. source on line 204, and the feedback winding 222 so that the transistors are alternately conducting in a free running manner to produce the 2500 cycle signal at the secondary 223.

Transformer 220 has a high permeability core having a substantially square hysteresis loop as is well known. The transformer has a primary winding 221, a secondary winding 223 and a feedback winding 222. The voltages in these windings appear as square waves having sharp leading and trailing edges which increase transformer performance.

The emitters of T–14 and T–15 are commonly connected at 224 to lines 225 and 229 to the common terminal 201. The collectors are connected to opposite ends of primary 221. The bases of T–14 and T–15 are connected to opposite ends of the feedback winding 222 on lines 228 and 227.

The conduction path of T–14 and T–15 is supplied by the connection at 226 of the negative 9.5 volts on line 204 to the center tap of primary 221.

Initially either transistor T–14 or T–15 may conduct current. However, any noise or unbalance in the circuit will inherently make one transistor conduct before the other. Such conduction will prevent the other transistor from conducting for a short interval, after which the two will alternately conduct in an oscillatory fashion as will appear hereinafter.

Assume T–14 is conducting: current will flow from ground 201 and T–14 through the top half of primary winding 221; this will induce a voltage into the lower half of the primary winding and into the feedback winding to cut off T–15 at both its collector and base circuit respectively; the feedback to the base of T–14 is positive and forces T–14 into further conduction until saturation of the transformer occurs.

When transformer saturation occurs, a change in collector current of T–14 produces no further increase in the feedback winding voltage. Hence, the magnetic field of the feedback winding collapses to induce a voltage which will make T–15 conduct and T–14 cease conduction.

The above action is similar to that of two blocking oscillators coupled together so that when one oscillator is blocked the other is operating and vice-versa.

This regenerative action of alternate conduction occurs at the rate of 2500 cycles, for example. The use of such high frequencies (as compared to a normal 60 cycles) in a power supply permits smaller power transformers. Normally such higher frequencies would produce higher hysteresis and eddy current losses which are undesirable. However, by utilizing low current transistors as opposed to vacuum tubes and by utilizing a square loop type of transformer these losses are minimized to the point where the high frequency converter is of practical utility.

The positive voltage power supply

The source for developing a positive 250 volts such as for use with the klystron is illustrated in block C. It comprises the secondary 223 of transformer 220, four rectifiers arranged in a bridge circuit 230 connected between lines 249 and 250 of the secondary of 220 filter capacitors 233 and 235, choke 234 and bleeder resistor 236. The operation of this circuit to develop a positive voltage at the top of the bleeder resistor is well known.

*The negative voltage supply—Developing the negative reference and repeller voltage*

The negative supply is shown in block D.

A low regulated reference negative voltage is desired on line 290 for connection to the base of T-13 and a high negative voltage is also desired at the repeller of the klystron to control and vary the frequency of the transmitter. Both of these voltages require regulation and both are obtained from the same supply.

Lead 245 is connected at 246 and terminal 231 is connected to the reference line 201. As a result diode 240 and capacitor 241 form a half wave rectifier when line 250 is positive with current flowing from 246 through 245, 241, 240, line 201 to line 248, and through diode 247 back to the top side of the transformer at 249.

On the reverse half of the cycle, line 249 is positive and line 250 is negative so that the voltage between 249 and the lead 251 includes both the secondary voltage of winding 223 and the voltage across capacitor 241 which are both of the same polarity.

Consequently, voltage doubling occurs as the negative voltage of the winding 223 and of capacitor 241 both feed through diode 242 to charge capacitor 243 through bleeder 236, choke 234, terminal 232 and diode 260 to line 249.

This doubled voltage across 243 is then connected through resistor 261 to zener diode 265 which provides a regulated negative 100 volt output.

A series of bleeder resistors 266-270 are connected in series with diode 280 across the negative supply. A variable tap is provided at 281 for connection of a reference voltage on line 290 to the base of T-13 for regulation as described before.

A potentiometer 282 is connected across resistor 268 and variable tap is provided for 283 for supplying the klystron repeller as a frequency control means.

The overall cooperation of block A, B, C and D provides a self protective power supply which will cease operating automatically if a fault occurs. For example, assume that the repeller of the klystron were shorted to ground.

In such as case, normally the power supply or its fuse would burn up and require replacement. However, in the above embodiment, such a fault would provide ground at the base of T-13 through line 290 thereby causing T-13 to cease conduction; T-12 would conduct its maximum current and T-10 and T-11 would cease conducting so that the voltage on line 204 drops. The converter and these transistor circuits are thereby made inoperative; and the power supply is thus protected.

On the other hand, when the fault is removed, the power supply automatically becomes operative again.

While a preferred embodiment of my invention has been described above, it will be obvious to those skilled in the art that further modifications of my invention are available. A change in transmitted frequency, audio bandpass, opposite conductivity transistors, variations in the amplifier gating, antenna, clipping and regulator circuits are conceivable equivalents within the scope of this invention.

Accordingly, this invention is defined in the following claims.

I claim:

1. Vehicle speed measuring apparatus comprising first means for transmitting high frequency radio waves along a vehicular pathway and for receiving Doppler speed modified high frequency waves reflected from the vehicle, means for mixing the reflected and transmitted waves to provide a beat frequency representing the speed of a detected vehicle, a stabilized low frequency transistor amplifier for amplifying the beat frequency waves and providing an output signal substantially independent of temperature and voltage variations, and means responsive to the frequency of the output signal for indicating the speed of the vehicle detected, said first means including individual waveguide sections for transmitting and receiving and a single waveguide horn member commonly attached to both the transmitting and receiving waveguides.

2. Speed measuring apparatus as in claim 1 and further including a high frequency oscillator mechanically coupled to one waveguide member and a mixer assembly mechanically coupled to the other waveguide member, thereby reducing the antenna noises.

3. Speed measuring apparatus as in claim 1 in which the individual waveguides are rectangular and have a common adjoining wall extending in the horizontal direction and in which the common horn includes a first plate member extending from a side of one waveguide parallel the common wall and flared upward at a divergent angle, and a second plate member extending from a side of the other waveguide parallel the common wall and flared downward at a divergent angle.

4. Vehicle speed measuring apparatus comprising transmitting and receiving antenna means having individual waveguide sections for transmitting and receiving and a single common radiating wave guide horn which is directed at moving vehicles, oscillator means associated with one waveguide section and crystal mixer means associated with the other waveguide section, stabilized semi-conductor audio amplifier means for amplifying received signals detected by said mixer substantially independent of temperature and voltage variations, and frequency measuring indicator means for receiving the output of said amplifier and for indicating the speed of a detected vehicle.

5. In a radar speed meter for detecting vehicles which has means for transmitting receiving and detecting high frequency radio waves and for amplifying the detected waves and measuring the frequency of such waves as an indication of the speed of the vehicle detected, the improvement in the combination comprising two parallel wave guide members having a common wall and being individually adapted for transmitting or receiving the high frequency waves, parabolic reflectors terminating one end of each waveguide and means including a waveguide opening substantially only toward the reflector for radiating energy toward the reflector in the transmitting wave guide and means including a wave-guide opening substantially only toward the reflector for receiving the energy from the reflector in the receiving waveguide so that a high gain, highly directive and compact antenna assembly is available for the detection of vehicle speeds.

6. In a radar speed meter having a transistor amplifier and a high frequency oscillator which are operated from a regulated voltage source of low and high voltages respectively, the combination of a self-protected power supply comprising a transistor controlled low voltage direct current power supply having an output for providing a low voltage for operating the transistor amplifier, a transistor converter circuit connected to said output for converting the low voltage direct current output into a higher voltage alternating current voltage output, means for rectifying said alternating voltage for providing a high voltage direct current for operation of said oscillator, and means connected to said high voltage direct current source for controlling said transistor controlled low-voltage supply so that the faults in the power supply will automatically shut-down the power supply.

7. In a combination having a low and high voltage power supplies, each having inputs and outputs, the combination of a transistor controlled low voltage regulated supply including means for comparing its output voltage with a constant reference voltage to provide such regulation of the low voltage power supply, means for converting the output of the regulated low voltage supply to a high voltage alternating current, and a constant voltage means connected to said high voltage supply for supplying said reference voltage.

8. The combination as in claim 7 in which the constant voltage means includes a Zener diode.

9. The combination as in claim 7 in which the transistor controlled low voltage regulated supply includes a transistor having its emitter-collector circuit connected between the input and output of the low voltage supply, and means for connecting the base of the last-named transistor to said reference voltage.

10. A compact transmitting and receiving antenna apparatus comprising a hollow conducting channel having first and second ends, a reflector enclosing the first end of said channel, means extending within said channel between said first and second ends for dividing the channel into two substantially equal size and similarly shaped channels, means for transmitting energy in one of said channels toward said reflector and for receiving reflected energy in the other of said similarly shaped channels from said reflector, a sectorial horn having two open ends of different dimensions, and means for connecting the smaller end of said sectorial horn to enclose the second end of said conducting channel.

11. In a radar speed meter having means for radiating high frequency waves at moving vehicles and for receiving and detecting waves which are modified in frequency in proportion to the speed of the vehicle, and having means for amplifying the detected waves to provide a speed indication at a frequency responsive circuit, the combination of a normally closed gated-driver transistor amplifier which normally blocks the passage of detected signals to the frequency measuring speed indicator circuit, transistor control means having input and output means normally controlled by threshold bias means, means connecting said detected signal to said control input to operate said control means and provide an output when the detected signal exceeds said threshold so that the control output will open said gated-driver and allow said detected signal to pass said frequency measuring circuit, and in which said transistor control means includes a transistor multivibrator having an input and an output with one transistor normally conducting and another transistor normally non-conducting, means connecting said output of said multivibrator to control said gated-driver, and means connected to said input of said multivibrator and responsive to the amplitude of said detected signal for reversing the conductivity conditions of said multivibrator, thereby opening said driver amplifier.

12. In a radar speed meter having means for radiating high frequency waves at moving vehicles and for receiving and detecting waves which are modified in frequency in proportion to the speed of the vehicle, and having means for amplifying the detected waves to provide a speed indication at a frequency responsive circuit, the combination of a normally closed gated-driver transistor amplifier which normally blocks the passage of detected signals to the frequency measuring speed indicator circuit, transistor control means having input and output means normally controlled by threshold bias means, means connecting said detected signal to said control input to operate said control means and provide an output when said detected signal exceeds said threshold so that the control output will open said gated-driver and allow said detected signal to pass to said frequency measuring circuit, and in which said gated-driver includes first and second transistors, each having two terminals for connection to a source of power, and a control terminal; means commonly connecting one of said two terminals of each of said transistors and means connecting the common point to one side of a source of power, means connecting the other of said two terminals of each of said transistors to the other side of said source of power, means connecting the control terminal of one of said transistors for reception of the detected signal and means connecting the output of the control means to the control terminal of the other transistor.

References Cited by the Examiner
UNITED STATES PATENTS

| | | | |
|---|---|---|---|
| 2,602,895 | 7/52 | Hansen | 343—779 |
| 2,785,395 | 3/57 | Platzman | 343—8 |
| 3,046,412 | 7/62 | Seike | 307—88.5 |
| 3,072,901 | 1/63 | Ruppersberg | 343—8 |

OTHER REFERENCES

Basic Theory and Application of Transistors, TM 11-690; Department of the Army Technical Manual; March 17, 1959.

CHESTER L. JUSTUS, *Primary Examiner.*

FREDERICK M. STRADER, *Examiner.*